US008542681B2

(12) United States Patent
Andrews et al.

(10) Patent No.: US 8,542,681 B2
(45) Date of Patent: *Sep. 24, 2013

(54) METHOD AND SYSTEM FOR SIMPLIFIED NETWORK WIDE TRAFFIC AND/OR FLOW MONITORING IN A DATA NETWORK (75) Inventors: Robert Andrews, Morgan Hill, CA (US); Navindra Yadav, San Jose, CA (US); Shree Murthy, San Jose, CA (US); Gnanaprakasam Pandian, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 305 days.

This patent is subject to a terminal disclaimer.

(21) Appl. No.: 12/883,531

(22) Filed: Sep. 16, 2010

(65) Prior Publication Data

US 2011/0010449 A1    Jan. 13, 2011

Related U.S. Application Data (63) Continuation of application No. 11/353,319, filed on Feb. 13, 2006, now Pat. No. 7,804,832.

(51) Int. Cl.
*H04L 12/28* (2006.01)
(52) U.S. Cl.
USPC ......................................................... 370/390
(58) Field of Classification Search
None
See application file for complete search history.

(56) References Cited

U.S. PATENT DOCUMENTS

| 5,819,028 | A  | * | 10/1998 | Manghirmalani et al. ...... 714/57 |
| 5,959,985 | A  | * | 9/1999  | Freen et al. .................... 370/351 |
| 6,035,105 | A  | * | 3/2000  | McCloghrie et al. ......... 709/236 |
| 6,058,429 | A  | * | 5/2000  | Ames et al. ................... 709/242 |
| 6,128,665 | A  | * | 10/2000 | Iturralde ....................... 709/238 |
| 6,137,775 | A  | * | 10/2000 | Bartlett et al. ................ 370/216 |
| 6,169,754 | B1 | * | 1/2001  | Sugawara et al. ............ 370/535 |
| 6,181,702 | B1 | * | 1/2001  | Egbert .......................... 370/401 |
| 6,377,998 | B2 | * | 4/2002  | Noll et al. ..................... 709/236 |
| 6,445,715 | B1 |   | 9/2002  | Annaamalai et al. |
| 6,515,969 | B1 | * | 2/2003  | Smith ........................... 370/256 |
| 6,535,491 | B2 |   | 3/2003  | Dutt et al. |
| 6,570,875 | B1 | * | 5/2003  | Hegde .......................... 370/389 |
| 6,651,092 | B1 |   | 11/2003 | Muraoka |
| 6,678,241 | B1 | * | 1/2004  | Gai et al. ..................... 370/216 |
| 6,731,596 | B1 | * | 5/2004  | Chiang et al. ................ 370/217 |
| 6,757,286 | B1 | * | 6/2004  | Stone ....................... 370/395.53 |
| 6,823,383 | B2 | * | 11/2004 | MacBride .................... 709/224 |
| 6,971,028 | B1 |   | 11/2005 | Lyle et al. |
| 7,055,174 | B1 | * | 5/2006  | Cope et al. ..................... 726/22 |
| 7,203,796 | B1 | * | 4/2007  | Muppalaneni et al. ....... 711/114 |
| 7,292,573 | B2 | * | 11/2007 | LaVigne et al. .............. 370/390 |
| 7,325,111 | B1 | * | 1/2008  | Jiang ............................ 711/162 |
| 7,474,666 | B2 | * | 1/2009  | Kloth et al. .................. 370/401 |
| 7,486,674 | B2 | * | 2/2009  | Regan .......................... 370/390 |
| 7,506,065 | B2 | * | 3/2009  | LaVigne et al. .............. 709/245 |
| 7,526,541 | B2 | * | 4/2009  | Roese et al. .................. 709/223 |
| 7,554,997 | B1 | * | 6/2009  | Schlichter et al. ............ 370/402 |
| 7,555,562 | B2 | * | 6/2009  | See et al. ...................... 709/240 |
| 7,573,859 | B2 | * | 8/2009  | Taylor .......................... 370/338 |

(Continued)

*Primary Examiner* — Ayaz Sheikh
*Assistant Examiner* — Faiyazkhan Ghafoerkhan
(74) *Attorney, Agent, or Firm* — Cesari and McKenna, LLP (57) ABSTRACT

Method and system for providing dynamic network data traffic monitoring including monitoring a data network, detecting a change in the data network, initiating a span session based on the detected change in the data network, and dynamically modifying network configuration based on the detected change in the data network is disclosed.

19 Claims, 7 Drawing Sheets

(56) References Cited

U.S. PATENT DOCUMENTS

| | | |
|---|---|---|
| 7,584,298 B2 | 9/2009 | Klinker et al. |
| 7,804,832 B2 * | 9/2010 | Andrews et al. .............. 370/390 |
| 2003/0212869 A1 * | 11/2003 | Burkey ......................... 711/162 |
| 2004/0003094 A1 * | 1/2004 | See .............................. 709/227 |
| 2004/0042416 A1 | 3/2004 | Ngo et al. |
| 2004/0044754 A1 | 3/2004 | Virdy et al. |
| 2004/0049602 A1 * | 3/2004 | MacBride .................... 709/250 |
| 2005/0053073 A1 * | 3/2005 | Kloth et al. .............. 370/395.41 |
| 2005/0114522 A1 * | 5/2005 | LaVigne et al. .............. 709/228 |
| 2005/0220092 A1 * | 10/2005 | LaVigne et al. .............. 370/389 |
| 2005/0278565 A1 * | 12/2005 | Frattura et al. .................... 714/5 |
| 2006/0002311 A1 | 1/2006 | Iwanaga et al. |
| 2006/0023718 A1 | 2/2006 | Joly |
| 2006/0029075 A1 * | 2/2006 | Sheppard et al. ............. 370/392 |
| 2006/0037075 A1 * | 2/2006 | Frattura et al. .................. 726/22 |
| 2006/0059163 A1 * | 3/2006 | Frattura et al. .................. 707/10 |
| 2006/0067216 A1 * | 3/2006 | Lalonde et al. ............... 370/230 |
| 2006/0248229 A1 * | 11/2006 | Saunderson et al. .......... 709/245 |
| 2007/0056028 A1 * | 3/2007 | Kay .............................. 726/11 |
| 2007/0058540 A1 * | 3/2007 | Kay .............................. 370/230 |
| 2007/0189189 A1 * | 8/2007 | Andrews et al. .............. 370/254 |
| 2008/0025322 A1 * | 1/2008 | Tadimeti et al. .............. 370/400 |
| 2011/0010449 A1 * | 1/2011 | Andrews et al. .............. 709/224 |

\* cited by examiner

METHOD AND SYSTEM FOR SIMPLIFIED NETWORK WIDE TRAFFIC AND/OR FLOW MONITORING IN A DATA NETWORK

REFERENCE TO RELATED APPLICATIONS

This application is a continuation of copending U.S. patent application Ser. No. 11/353,319 filed Feb. 13, 2006 by Robert Andrews, Navindra Yadav, Shree Murthy, and Gnanaprakasam Pandian, entitled METHOD AND SYSTEM FOR SIMPLIFIED NETWORK WIDE TRAFFIC AND/OR MONITORING IN A DATA TRAFFIC NETWORK, which is hereby incorporated by reference in its entirety.

FIELD OF THE INVENTION

The present invention relates to data network management. More specifically, the present invention relates to dynamically monitoring and managing the topology of a data network by mapping sources and destinations of the users and/or end systems.

BACKGROUND

Setting up and maintaining span sessions in a network typically require the administrator to overcome several obstacles when configured to monitor users, hosts and/or ports on the data network. For example, in the case where a user or a host is to be monitored, details about the connection of the user or host to the network such as how data traffic configured to be sent to the user or host is to be differentiated from other traffic on the network, for example, must be determined before a span session may be set up. Similar challenge exists if the destination of a span session is specifically defined as a user or a host. More specifically, in this case, the specific details regarding the destination host's connection (such as the IP address) must be determined.

To further add complications, after the span session is configured and set up, the connection details as discussed above may change over time depending upon the change in the network topology. Thus, a static span session may in such context not be functional especially if the source or destination may change within the network.

Moreover, in configuring and setting up span sessions across a network, traffic to be spanned across the network typically are sent out of band in some manner from the source to the destination. This may involve set up and use of a dedicated vlan (Virtual Local Area Network) or alternatively, it may involve modification of and tunneling of the monitored traffic. Substantial modification to the configuration of a network is a significant challenge especially in the case where the entity such as the administrator which initially configured the network is not involved in the process of reconfiguration of the network.

Existing approaches for setting up of span sessions in the network are generally limited in functionality as they are implemented as add-ons to the network. For example, one approach includes the examination of the configuration files on network devices, and by snooping packets. A limitation of this approach is that the configuration files on the network devices are not a substitute for the know-how of the administrator that initially configured the network. While the configuration files in the network devices provide the properties of the network configuration, they do not typically provide the reasons behind the properties for the configuration in the network. Thus, any reconfiguration of the network without fully comprehending the reasons behind the properties for the configuration of the network devices may not yield the optimum configuration.

Furthermore, with respect to the challenge of the network configuration changes over time, network add-ons may not be configured to be fully integrated into every network device in the network, and thus, cannot reliably track the users and hosts as they migrate within the network, changing the network topology. Moreover, existing approaches cannot track users or groups of users because of their dynamic nature—that is, users can migrate from machine to machine within the network, while hosts can migrate from port to port.

In view of the foregoing, it would be desirable to have methods and systems for providing network traffic flow monitoring and dynamic changes implemented automatically to the network topology to capture the modification in the network topology.

SUMMARY OF THE INVENTION

A method of providing dynamic network data traffic monitoring in accordance with one embodiment of the present invention includes monitoring a data network, detecting a change in the data network, initiating a span session based on the detected change in the data network, dynamically modifying network configuration based on the detected change in the data network.

The step of initiating a span session may include the steps of allocating a virtual LAN (VLAN) for the span session, and retrieving a span source and a span destination information.

In one embodiment, the method may further include the step of storing the span source information, the span destination information and the span session information.

Also, the step of retrieving the span source and the span destination information in a further embodiment may include the step of receiving the span source and destination information in the data network from an administrator, and further, continuously keeping track of where the source and destination are connected in the network.

Additionally, the step of dynamically modifying the network configuration may include the step of performing a VLAN trunking protocol (VTP) configuration associated with the span session.

The step of dynamically modifying the network configuration in a further embodiment may include the steps of determining a connection of the span source and the span destination, and enabling one of a local SPAN session, a remote SPAN session, or a SPAN tunneling for the span source and destination.

Moreover, the step of enabling the local SPAN session in still another embodiment may include the steps of determining a network device connected to both the span source and the span destination on the network, and enabling a local SPAN session on the network device. Further, the step of enabling the remote SPAN session in yet another embodiment may include the step determining a network device connected to the span source and the span destination by a layer 2 Ethernet switched network. Still further, the step of enabling SPAN tunneling in another embodiment may include the steps of determining a first router connected to the span source and a second router connected to the span destination in the data network, and setting up a tunnel to carry the monitored traffic, and determining the first router and the second router directly connected to two layer 2 Ethernet switched networks in the data network.

A method of providing dynamic network data traffic monitoring in accordance with another embodiment of the present invention includes monitoring a data network, detecting a change in a port of the data network, allocating a virtual LAN (VLAN) for a span session associated with the change in the port, retrieving a span source and a span destination information, modifying network configuration based on the detected change in the data network.

The step of modifying the network configuration in one embodiment may include the step of performing a VLAN trunking protocol (VTP) configuration associated with the span session.

A system for monitoring and dynamically configuring a data network in accordance with still another embodiment of the present invention includes a data network, a source and destination client terminal(s) coupled to the data network, one or more network devices coupled to the data network, a controller unit coupled to the data network, the controller configured to maintain a monitor session between the client terminals, and further, wherein the controller unit is configured to initiate a span session based on a change in the monitored client terminal data traffic, and wherein the controller unit is configured to dynamically modify network configuration based on the detected change.

The controller unit configured to initiate the span session in one embodiment may be configured to allocate a virtual LAN (VLAN) for the span session, and to retrieve a span source and a span destination information associated with the detected change of the client terminal data traffic.

The controller unit may be further configured to store the span source information, the span destination information and the span session information.

Moreover, in yet another embodiment, the controller unit may be configured to perform a VLAN trunking protocol (VTP) configuration associated with the span session to dynamically modify the network configuration based on the detected change.

These and other features and advantages of the present invention will be understood upon consideration of the following detailed description of the invention and the accompanying drawings.

DETAILED DESCRIPTION

Figure 1:
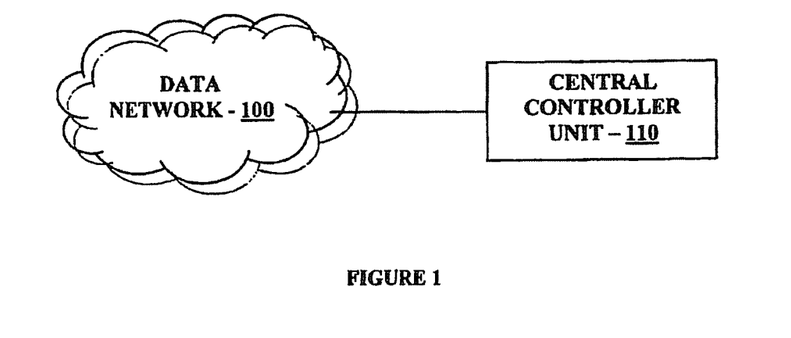
FIG. 1 is a block diagram of an overall data network for practicing one or more embodiments of the present invention.

FIG. 1 is a block diagram of an overall data network coupled to a central controller for practicing one or more embodiments of the present invention. Referring to FIG. 1 as can be seen, there is provided a central controller unit 110 coupled to a data network 100. In one embodiment, the data network 100 may include one or more local area networks (LANs) and/or a wide area network (WAN) that is operatively coupled to and is subject to the configuration control by the central controller unit 110.

Figure 2:
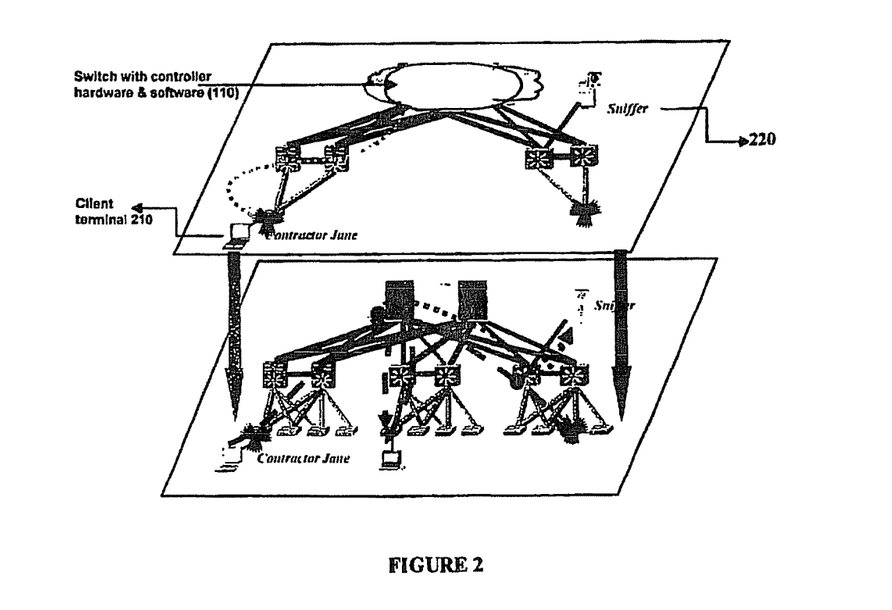
FIG. 2 is an exemplary network topology for practicing one or more embodiments of the present invention.

FIG. 2 is an exemplary network topology for practicing one or more embodiments of the present invention. Referring to FIG. 2, in one embodiment, the central controller unit 110 (or a switch on the network with the controller software and hardware) is configured to provide operational control of data traffic and monitoring of one or more sources such as client terminals 210 and a corresponding destination such as a respective sniffer 220. In this manner, the central controller unit 110 may be configured to maintain information for and keep track of other controllers within the LANs in the data network 100. Furthermore, the central controller unit 110 in one embodiment is configured to provide management and user authentication control over the entire data network 100. That is, the central controller unit 110 may be configured to monitor the operation and/or activities of other controllers in the data network.

Furthermore, in one embodiment of the present invention, the central controller unit 110 may be configured to be in complete control of the network devices within the data network 100—that is, the network devices which support the network 100. For example, the central controller unit 110 in one embodiment is responsible for the configuration of VLAN trunking protocol (VTP) which is the mechanism used to specify overlays of each logical network (VLAN) over the physical network in the data network 100.

Figure 3:
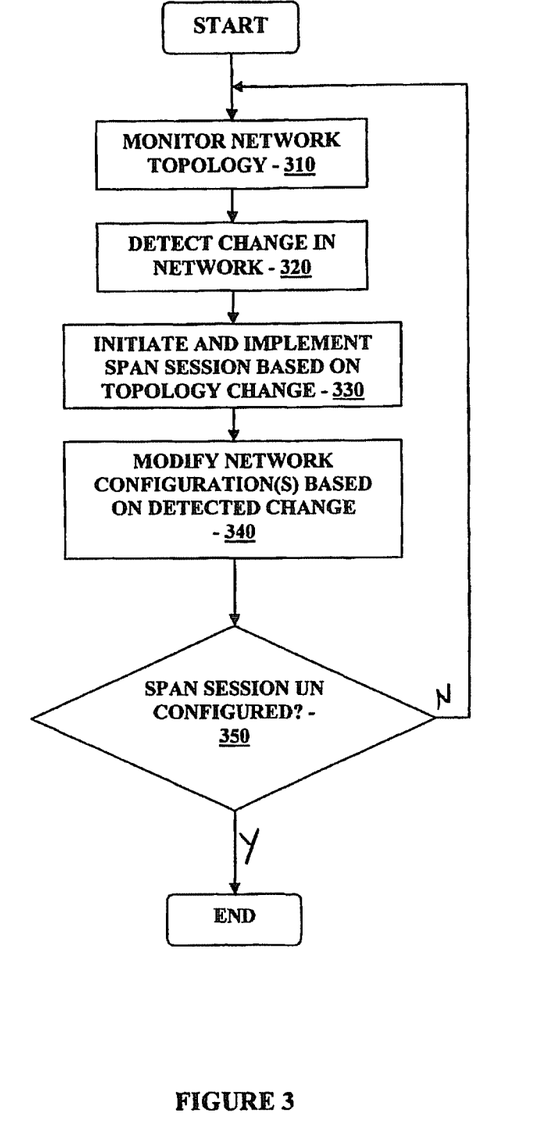
FIG. 3 is a flowchart illustrating the dynamic network monitoring in accordance with one embodiment of the present invention.

FIG. 3 is a flowchart illustrating the dynamic network monitoring in accordance with one embodiment of the present invention. Referring to FIG. 3, at step 310, the central controller unit 110 (FIG. 1) is configured to monitor the network topology of the data network 100 (FIG. 1), and at step 320, the central controller unit 110 is configured to detect a change in the data network 100. A detected change in the network 100 may include for example, but not limited to, user authentication request received from a new device in the network 100 which is not previously authenticated by the central controller unit 110. In addition, a further example of a detected change in the network 100 may include a previously authenticated user who has moved and now connects to another point in the network 100. In this case, the central controller unit 110 detects the change corresponding to the authenticated user connecting to another point in the network 100 when it receives the authentication request received from the client terminal of the user from another point in the network 100, while it is no longer connected to the earlier point of connection or attachment in the network 100.

Referring back to FIG. 3, when the change in the network 100 is detected at step 320, the central controller unit 110 at step 330 is configured to initiate and implement a span session based on the detected network topology change. Further details on the procedure for the span session at step 330 is provided below in conjunction with FIGS. 4 and 5. Referring to FIG. 3 again, after the span session is implemented at step 330, the central controller unit 110 is configured to modify the network configuration based on the span session associated with the detected change in the network at step 340.

Thereafter, the central controller unit 110 is configured to determine if the span session is unconfigured by the administrator at step 350, and if it is determined that the span session is unconfigured by the network administrator, then the routine terminates. On the other hand, if at step 350 central controller unit 110 determines that the span session is not unconfigured by the network administrator, then the routine returns to step 310 to continue monitoring the network topology for change. In other words, in one embodiment, while there is an active span session, the central controller unit 110 is configured to continuously run the routine or algorithm described in FIG. 3, to detect any change in the network topology.

Figure 4:
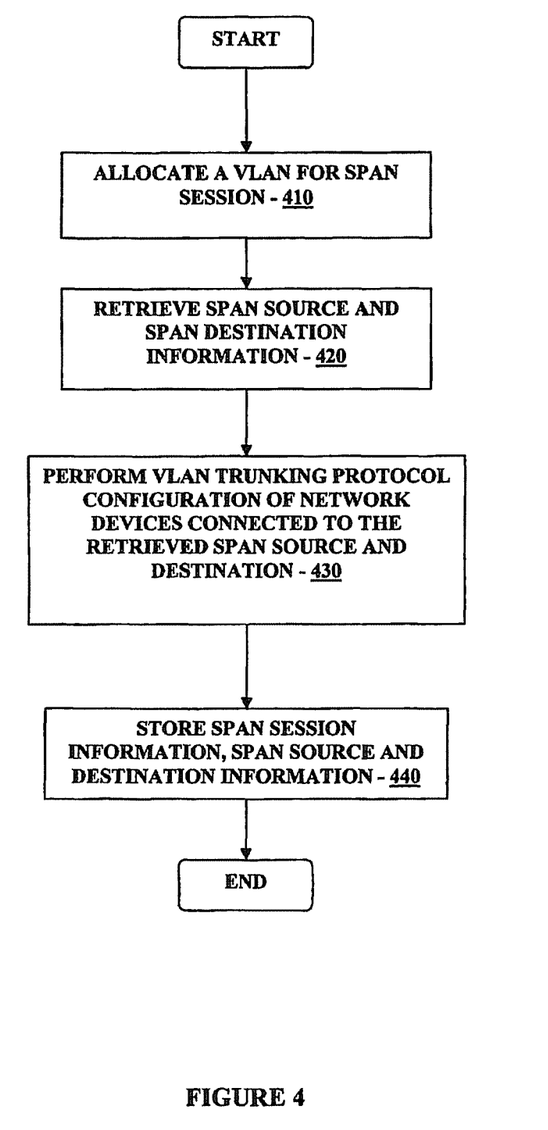
FIG. 4 is a flowchart illustrating the initiating and monitoring of span session of step 330 in FIG. 3 in accordance with one embodiment of the present invention.

FIG. 4 is a flowchart illustrating the initiating and implementation of the span session of step 330 in FIG. 3 in accordance with one embodiment of the present invention. Referring to FIG. 4, for the span session, at step 410, the central controller unit 110 is configured to allocate a VLAN to implement the span session. In one embodiment, the VLAN may be automatically allocated for the implementation of the span session, and further, the network administrator need not be informed of which VLAN is allocated to the span session, or even that a VLAN has been allocated.

Referring back to FIG. 4, after the VLAN is allocated to the span session at step 410, the span source information and span destination information for the span session is retrieved by the central controller unit 110 at step 420.

In one embodiment, the network administrator may provide or specify the sources and destinations for the span session. Further, the central controller unit 110 is aware of all users and hosts which are connected to the network 100 and also, where the users and hosts are connected within the network. In other words, the central controller unit 110 is aware of the network topology as described at step 310 in conjunction with FIG. 3 above. Accordingly, the central controller unit 110 is aware of the set of network devices through which the span sources and span destinations (received from the network administrator) associated with the span session are connected in the network 100.

Referring back to FIG. 4, at step 420, since span sources and destinations for the span session are provided by the network administrator, the central controller unit 110 in one embodiment configures the network devices through which the span sources and destinations are connected using remote SPAN feature used to arrange or configure monitored traffic on the network 100 to be switched to or received from a specific VLAN.

Referring yet again to FIG. 4, after receiving the span source and destination information at step 420, the central controller unit 110 in one embodiment is configured to perform, at step 430, VLAN Trunking Protocol (VTP) configuration of the network devices coupled to the span sources and destinations specified by and received from the network administrator. More specifically, at step 430 the central controller unit 110 in one embodiment is configured to manipulate the VTP configurations on the network devices which causes the logical network of the dedicated VLAN allocated for the span session to overlay the physical network in the corresponding manner such that the spanned or monitored traffics is appropriately and accurately switched.

More specifically, on the network device connected to the SPAN source and the network switch connected to the SPAN destination, the central controller unit 110 in one embodiment configures the designated VLAN as a remote SPAN VLAN to VTP. The designated VLAN is the VLAN the central controller unit 110 dynamically allocated to be used to carry the span session. Moreover, the VLAN trunking protocol (VTP) is configured to dynamically ensure the traffic from the source network device reach the destination network device over a switched layer 2 Ethernet network.

After performing the VTP configuration of the network devices at step 430, the central controller unit 110 at step 440 is configured to store the span session information as well as the span source and destination information received from the network administrator for the span session. In this manner, the central controller unit 110 in one embodiment is configured to keep track of and monitor the span sessions, sources, and destinations, and is configured to be fully aware of the network configuration at all times. In the case where the central controller unit 110 detects a change in the network topology that would affect the requirements of the span settings on the network devices, the central controller unit 110 may be configured to operatively control the configuration of the individual network devices to ensure that the required span configuration changes occur. In this manner, in one embodiment of the present invention, the central controller unit 110 may be configured to monitor network traffic and dynamically change the network configuration including span sessions such that, the data is properly routed within the data network 100 and changes in the network topology are automatically and dynamically incorporated into the network configuration settings.

Figure 5:
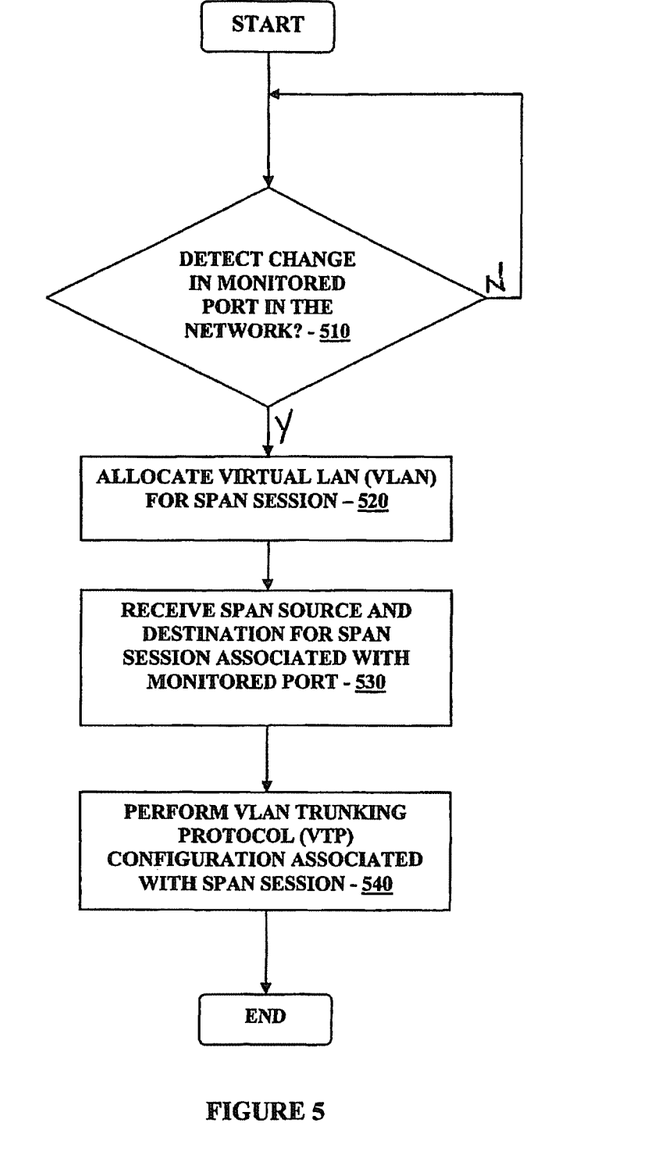
FIG. 5 is a flowchart illustrating dynamic network traffic monitoring in accordance with another embodiment of the present invention.

FIG. 5 is a flowchart illustrating dynamic network traffic monitoring in accordance with another embodiment of the present invention. Referring to FIG. 5, at step 510, the central controller unit 110 (FIG. 1) is configured to monitor the data network 100 for any changes in the monitored ports in the network 100. If a change is detected, then at step 520, a VLAN is allocated for a span session associated with the detected change. Thereafter, at step 530, span source and destination information associated with the monitored port for the span session is received or retrieved from the network administrator, for example. And then, at step 540, the central controller unit 110 is configured to perform VTP configuration associated with the span session.

Figure 6A:
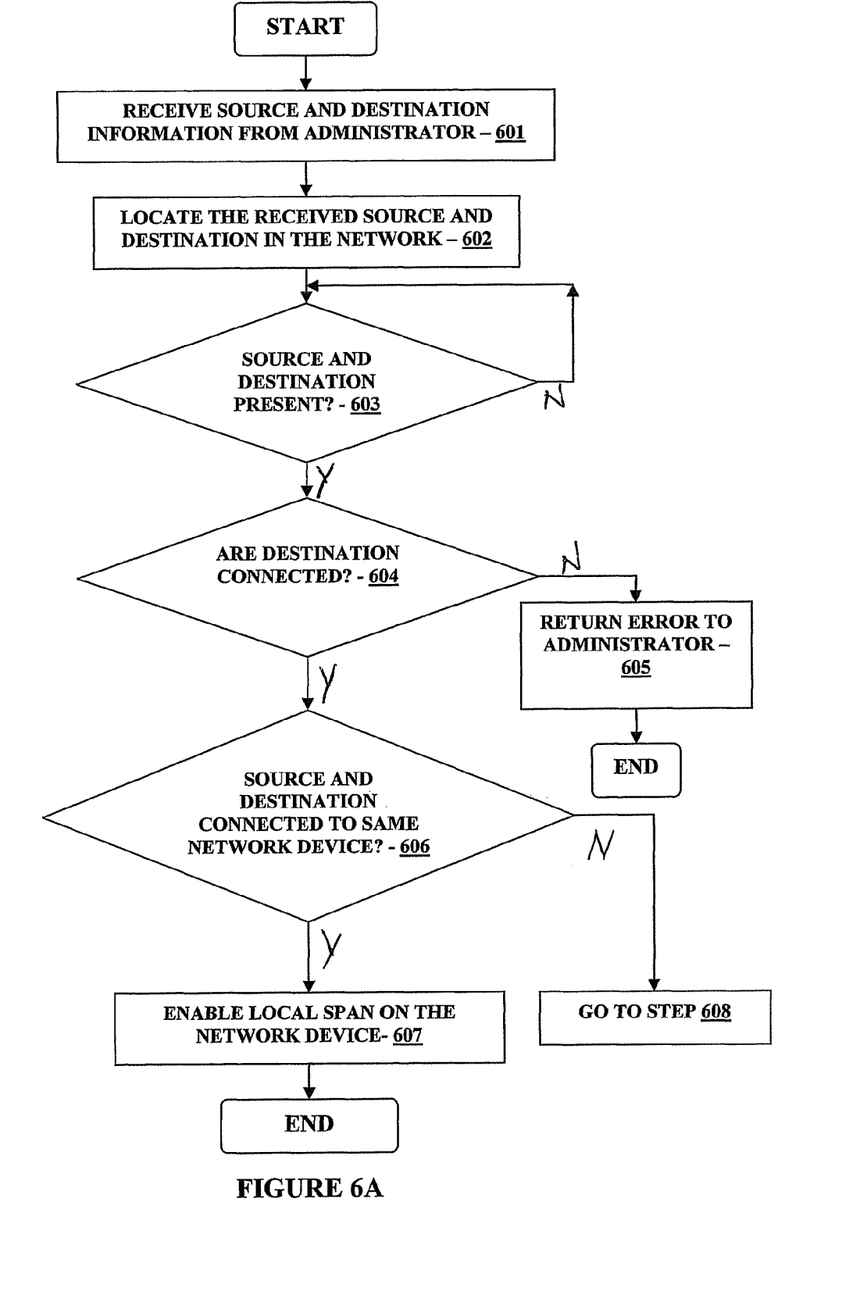
FIGS. 6A-6C is a flowchart illustrating dynamic network monitoring in accordance with anther embodiment of the present invention.
Figure 6B:
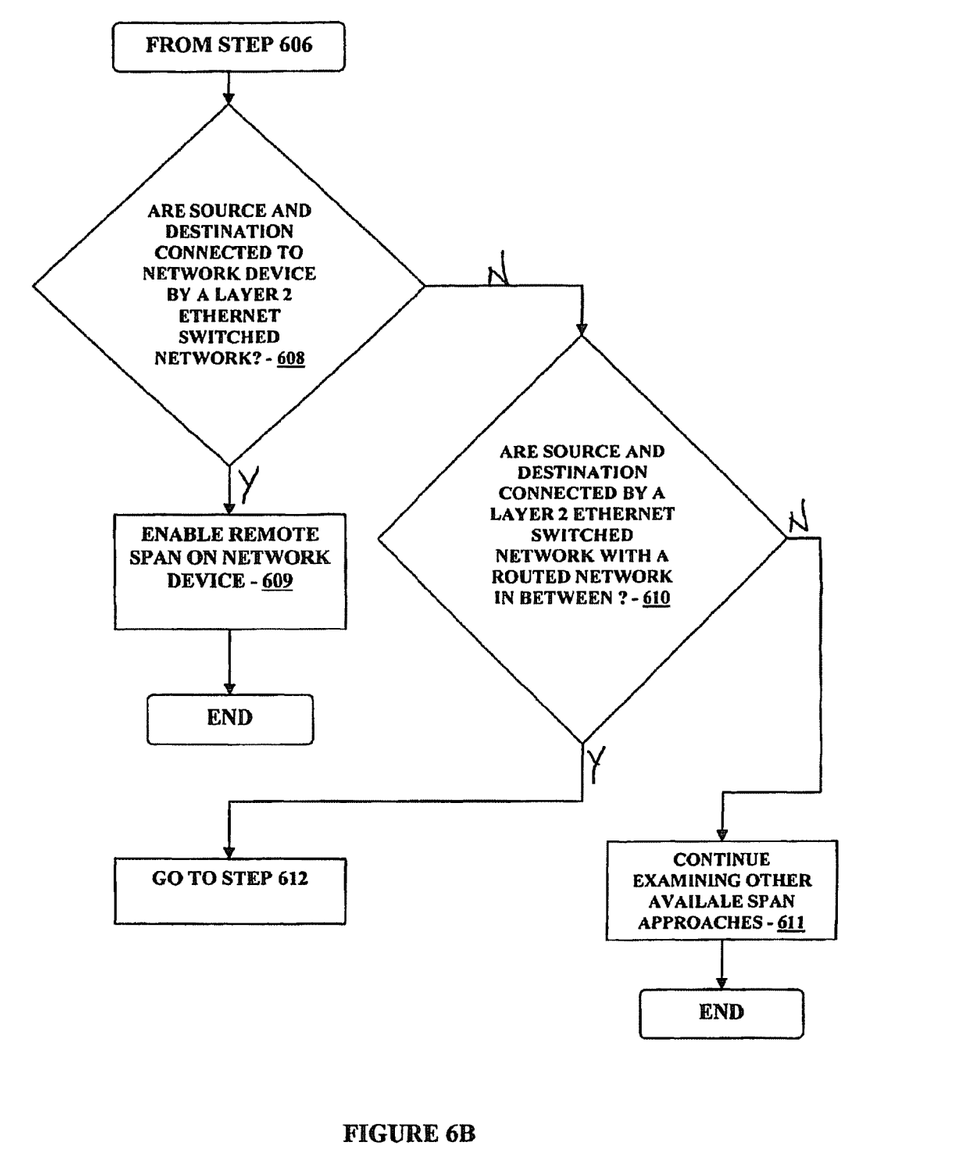
Figure 6C:
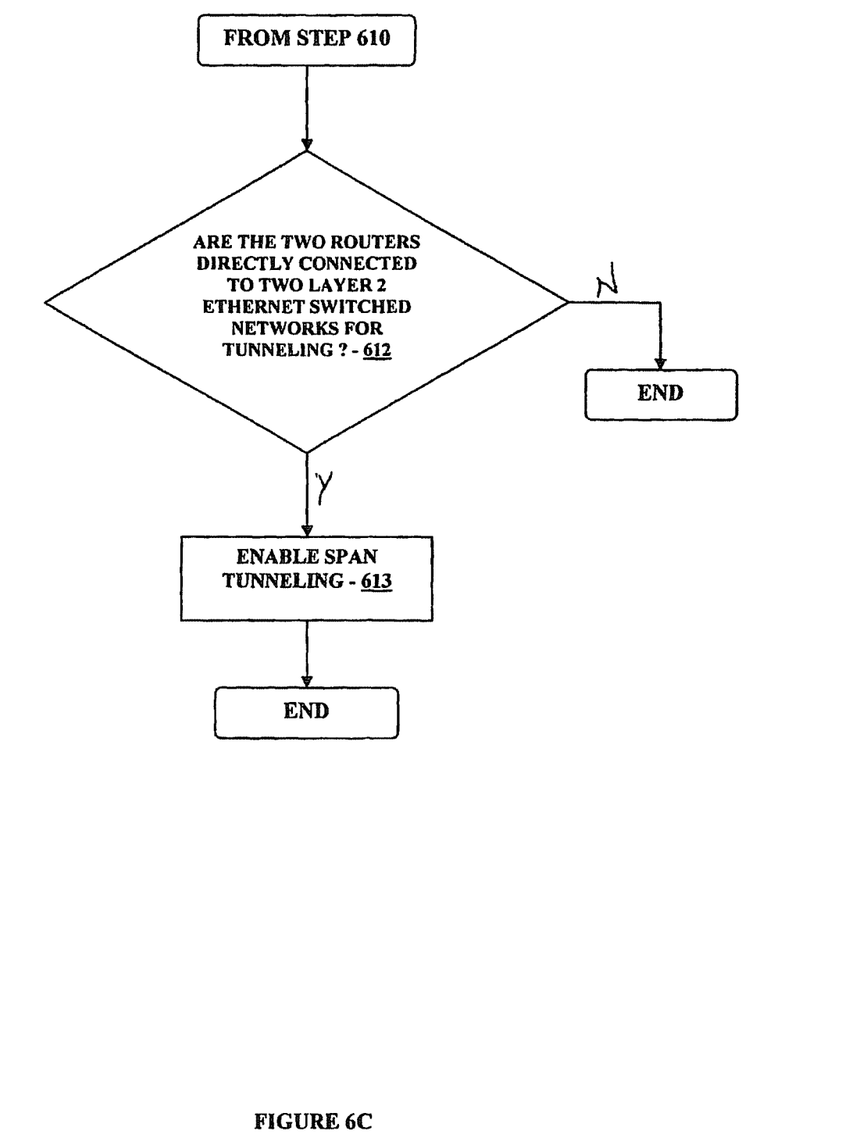

FIGS. 6A-6C is a flowchart illustrating dynamic network monitoring in accordance with another embodiment of the present invention. Referring to FIGS. 6A-6C, at step 601, the network administrator identifies the source of the network terminal or device for monitoring and the corresponding destination information. The central controller unit 110 (FIG. 1) is configured to receive the source and destination information at step 601, and at step 602, is configured to locate the identified source and destination for monitoring in the network. For example, in one embodiment, the identified source for monitoring may include a client terminal 210 (FIG. 2) connected to the network 100, and the corresponding destination may include a sniffer 220 (FIG. 2) for the client terminal 210 in the data network 100. If for example, either the identified source or the destination is not present in the network 100, then the central controller unit 110 continues to monitor the network topology to detect when the source and destination are connected back to the data network 100 which may be at a later point in time.

Referring to FIGS. 6A-6C, after locating the source and destination for monitoring in the network 100 at step 602, the central controller unit 110 determines whether the source and destination are present in the data network 100 at step 603. If it is determined at step 603 that either the source or the destination are not present in the network 100, then the central controller unit 110 is configured to continue to monitor the network 100 for topology change, for example, such as when the source and the destination are in the network 100.

Referring again to FIGS. 6A-6C, if the central controller unit 110 determines at step 603 that the source and the destination are present in the network, the central controller unit 110 determines whether the source and destination are connected in the network 100 at step 604. If it is determined that the source and destination are not connected in the network 100 at step 604, then at step 605, the central controller unit 110 is configured to return an error notification to the network administrator and the procedure terminates.

On the other hand, at step 604 it is determined that the source and the destination are connected in the network 100, then at step 606 it is determined whether the source and the destination are connected to the same network device in the network 100. If at step 606 it is determined that the identified source and the destination are connected to the same network device in the data network 100, then at step 607, the central controller unit 110 is configured to enable the local SPAN on the network device connected to the source and destination. In one aspect, local SPAN is a type of SPAN that is applicable when the SPAN source and the SPAN destination for a SPAN session are connected to the same network device. It may be enabled by configuring the SPAN source and the SPAN destination on the network device. Thereafter, the procedure terminates.

Referring back to FIGS. 6A-6C, if at step 606, it is determined that the source and destination are not connected to the same network device, then at step 608, the central controller unit 110 is configured to determine whether both the source and destination are connected by a layer 2 Ethernet switched network. If it is determined at step 608 that both the source and the destination are connected by a layer 2 Ethernet switched network, then at step 609, the central controller unit 110 is configured to enable the remote SPAN (RSPAN) associated with the source and destination.

More specifically, by way of an example, at step 609, the central controller unit 110 is configured to select a VLAN to use for the remote SPAN (RSPAN). Thereafter, the central controller unit 110 is configured to enable the RSPAN features on the selected VLAN including, for example, distributing the selected VLAN on the network and its configuration in the layer 2 network using VTP. For example, on the network device connected to the SPAN source and the network switch connected to the SPAN destination, the central controller unit 110 configures the designated VLAN as a remote SPAN (RSPAN) VLAN to VTP. The designated VLAN is the VLAN which the central controller unit 110 dynamically allocated to be used to carry the span session. The VTP handles dynamically ensuring the traffic from the source network device reach the destination network device over a switched layer 2 Ethernet network.

Furthermore, the central controller unit 110 is configured to enable a SPAN destination session on the network device to which the destination is connected in the network. For example, in the exemplary configuration shown in FIG. 2, the central controller unit 110 is configured to enable the SPAN destination session the network device to which the sniffer 220 is connected. Furthermore, the central controller unit 110 is configured to enable the traffic received by the network device to which the sniffer 220 is connected to be sent to the SPAN destination port (e.g., the sniffer port).

Similarly, the central controller unit 110 is configured to enable a SPAN source session in the data network 100 to which the source is connected. For example, in the exemplary configuration shown in FIG. 2, the central controller unit 110 is configured to enable a SPAN source session on the network device to which the client terminal 210 is connected. Thereafter, the central controller unit is configured to enable the network device to send a copy of the traffic to or from the client terminal 220 to the selected VLAN used for the remote SPAN (RSPAN).

Referring back to FIGS. 6A-6C, if it is determined at step 608 that the source and the destination are not connected by a layer 2 Ethernet switched network 100, then at step 610 it is determined whether both the source and destination are connected by a layer 2 Ethernet switched network with one or more routed network in between. If it is determined that the source and destination are not connected by a layer 2 Ethernet switched network with one or more routed network in between at step 610, then at step 611, the central controller unit 110 is configured to examine other available SPAN methods, and returns a corresponding notification to the administrator such as error or other SPAN method determined (which may include similar or modified SPAN techniques under the central controller unit 110).

On the other hand, if at step 610 it is determined that both the source and destination are connected by a layer 2 Ethernet switched network with one or more routed network in between, then at step 612, the central controller unit 110 is configured to determine whether the two routers are directly connected to the two layer 2 Ethernet switched networks capable of tunneling (encapsulation/decapsulation) data packets. While the two routers are directly connected to the respective source and/or destination, the source and/or destination may be directly or indirectly connected to the router. An example of an indirect connection to the router from the source and/or destination includes a layer 2 Ethernet network between the router and the source and/or destination.

If it determined at step 612 that the two routers are not directly connected to the two layer 2 Ethernet switched networks capable of tunneling (encapsulation/de-capsulation) data packets, then the procedure terminates, and the central controller unit 110 returns an error message to the administrator. Referring again to FIGS. 6A-6C, if at step 612 it is determined that the two routers are directly connected to the two layer 2 Ethernet switched networks capable of tunneling (encapsulation/de-capsulation) data packets, then at step 613, SPAN tunneling is enabled and the procedure ends. More specifically, when the SPAN tunneling is enabled at step 613, the central controller unit 110 is configured to enable SPAN tunneling on the two router end-points (where each of the two routers are respectively connected directly or indirectly via a layer 2 Ethernet network to the source and destination ports in the network 100) which connect to the layer 2 switched networks in the data network 100. In one aspect of the present invention, enabling the SPAN tunneling includes notifying the two tunnel end-points of each other's address such as the tunnel IP address.

Moreover, the central controller unit 110 is configured to inform the tunnel source end-point of the source of the tunnel traffic which is to be tunneled (for example, such as traffic match criteria including, ingress, remote SPAN, VLAN, or a port). Similarly, the central controller unit 110 also informs the tunnel destination end-point of the destination of the tunnel traffic (such as, for example, egress, remote SPAN, VLAN or a port). Then, the central controller unit 110 determines whether remote SPAN has to be used either on ingress or egress of layer 2 Ethernet switched networks. If remote SPAN needs to be used on either of the layer 2 switched networks, then the central controller unit is configured to enable remote SPAN on the applicable layer 2 network(s) in the manner similar to as described in conjunction with step 609 above. On the other hand, if remote SPAN is not needed, then the central controller unit 110 is configured to enable local SPAN on the egress router with the local SPAN source set to the tunnel output. More specifically, if the SPAN destination is attached directly to the egress router, then the egress router may make use of local SPAN to get the span traffic which is the output of the tunnel to the SPAN destination port on the same network device (router).

In this manner, the central controller unit 110 is configured to enable a SPAN source session on the network device to which the client terminal 210 (FIG. 2) is connected, and provides it directly to the tunnel or the VLAN of the remote SPAN. Furthermore, the central controller unit 110 is also configured to enable the network device to send a copy of the traffic to or from the client terminal 210 (FIG. 2) to the tunnel or the VLAN for the remote SPAN.

Accordingly, in one embodiment of the present invention, cumbersome and ongoing network configuration steps may be eliminated in network wide traffic monitoring. Moreover, the central controller unit 110 is configured to automatically, accurately and dynamically map users to devices, and to map hosts to locations, without the use of any external tools such as, for example, commercially available network sniffing tools.

Indeed, in accordance with the various embodiments of the present invention, the central controller unit is configured to use the handle by which the user or host is authenticated as the source and destination for monitor sessions in the network. The handle in one embodiment may include, but not limited to, a port, MAC address or a user name. In doing so, the user may configure the monitor session with high level intent. Since the central controller unit is configured to maintain a monitor session between two handles, and given that the central controller unit is the sole entity for maintaining intra-network configuration (thus fully aware of the network topology at all times), the central controller unit is capable of setting up and managing the necessary configurations on the network devices to maintain the monitor session without any administrative intervention as the network changes. Some examples of the network change discussed above includes, but not limited to user authentication in more than one host, user migration within the network, host migration within the network, and network topology change.

In this manner, in one embodiment of the present invention, the central controller unit is provided to the data network to configure all network devices within an administrative domain. The network administrator, rather than configuring each network device in the network, configures the central controller unit with high level intents for dynamic properties of the network configuration. In turn, the central controller unit is configured to translate the high level intents into low level implementation details dynamically on an ongoing basis, and to maintain the configuration of each network device on the network.

Accordingly, all hosts or users joining or leaving the network do so under the direct supervision of the central controller unit. This is valid regardless of the authentication mechanism used (such as the 802.1x). In the cases where the users or hosts do not authenticate with user name and/or passwords, they authenticate with location or MAC addresses. In this manner, the central controller unit in one embodiment is configured to reliably track the users and hosts as they migrate within the network being monitored and managed. Also, a user or host that is not tracked by the central controller unit is not permitted onto the network.

In the manner discussed above, in accordance with one embodiment of the present invention, the dynamic network traffic monitoring and management by the central controller unit provides cumbersome and ongoing configuration steps necessary to set up network wide traffic monitoring. Moreover, the network administrator need not be involved when the monitored entities or monitoring entities migrate within the network. Additionally, in one embodiment, by providing the central controller unit to the network to manage monitor sessions across a dynamic network, there is provided method and system for automatically, accurately and dynamically mapping users to devices without the use of an external tool, and further, for automatically, accurately and dynamically mapping hosts to locations without the use of an external tool such as, for example, a commercially available network sniffing tool.

Accordingly, in one embodiment, the central controller unit is configured to manage each user and host present in the network such that the central controller unit is configured to implement and dynamically maintain cross-network monitor port/flow sessions. Indeed, since the central controller unit has knowledge of every user and every host in the network, it is capable of comprehensive network monitoring and not limited to monitoring only specific types of network traffic.

The various processes described above including the processes performed by the central controller unit 110 in the software application execution environment in the data network 100 including the processes and routines described in conjunction with FIGS. 1-6C, may be embodied as computer programs developed using an object oriented language that allows the modeling of complex systems with modular objects to create abstractions that are representative of real world, physical objects and their interrelationships. The software required to carry out the inventive process, which may be stored in the memory (not shown) of the central controller unit 110, may be developed by a person of ordinary skill in the art and may include one or more computer program products.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of providing dynamic network data traffic monitoring, comprising:
    transmitting a request to access a data network for a source to be monitored, the request to access the data network indicating that the source has migrated in the data network to become coupled to a network device;
    receiving, responsive to the request to access the data network, information associated with a Virtual Local Area Network (VLAN) that has been automatically allocated for a Switched Port Analyzer (SPAN) session corresponding to the request to access the data network, the VLAN allocated for the SPAN session coupling the source and a destination that performs monitoring; and
    sending, by a network device, a copy of traffic to and from the source to the destination in the SPAN session, wherein the allocated VLAN carries the copy of the traffic sent to the destination in the SPAN session.

2. The method of claim 1 wherein the step of receiving information associated with the VLAN includes the step of receiving a SPAN source information and a SPAN destination information.

3. The method of claim 2 further including the step of storing the SPAN source information and the SPAN destination information.

4. The method of claim 1 further comprising:
    receiving information associated with a VLAN trunking protocol (VTP) configuration for the SPAN session.

5. The method of claim 4 further comprising:
    configuring the VLAN to support a remote SPAN (RSPAN) session.

6. The method of claim 1 further comprising:
    enabling a SPAN tunneling in the data network for the SPAN source and destination.

7. The method of claim 6 wherein the enabling the SPAN tunneling includes:
informing a tunnel source end-point and a tunnel destination end-point of the VLAN.

8. A system comprising:
a network device coupled to a data network; and
a controller unit coupled to the data network, the controller unit configured to:
detect a migration of a client terminal in the data network to become coupled to the network device;
in response to the detection of the migration of the client terminal, automatically initiate a Switched Port Analyzer (SPAN) session for monitoring the client terminal, the SPAN session coupling the network device to a destination that performs monitoring;
automatically allocate a Virtual Local Area Network (VLAN) for the SPAN session;
enable the network device to send a copy of traffic to and from the client terminal to the allocated VLAN; and
configure the data network to deliver the copy of traffic on the allocated VLAN to the destination that performs monitoring.

9. The system of claim 8 wherein the controller unit includes a memory, and the controller unit is further configured to store SPAN source and SPAN destination information in the memory.

10. The system of claim 9 wherein the controller unit is further configured to utilize a VLAN trunking protocol (VTP) to configure the data network to deliver the copy of traffic to the destination that performs monitoring.

11. The system of claim 10 wherein the controller unit is further configured to utilize the allocated VLAN to support a remote SPAN (RSPAN) session.

12. The system of claim 8 wherein the controller unit is further configured to enable a SPAN tunneling in the data network for the network device and the destination that performs monitoring.

13. The system of claim 12 wherein the controller unit is further configured to inform a tunnel source end-point and a tunnel destination end-point of the VLAN.

14. The system of claim 13 wherein the tunnel source end-point is the network device.

15. A method comprising:
detecting a migration of a source to be monitored in a data network such that the source becomes coupled to a network device;
in response to detecting the migration of the source, automatically initiating a Switched Port Analyzer (SPAN) session for monitoring the source, the SPAN session coupling the network device to a destination that performs monitoring;
automatically allocating a Virtual Local Area Network (VLAN) for the SPAN session, the VLAN to carry a copy of traffic to and from the source that is provided to the destination that performs monitoring; and
configuring the data network to deliver the copy of traffic on the allocated VLAN to the destination that performs monitoring.

16. The method of claim 15 wherein the step of automatically initiating further comprises providing a SPAN source and SPAN destination to the network device.

17. The method of claim 15 further comprising:
utilizing a VLAN trunking protocol (VTP) to configure the data network to deliver the copy of traffic to the destination that performs monitoring.

18. The method of claim 15 wherein the SPAN session is a remote SPAN (RSPAN) session.

19. The method of claim 15, further comprising:
identifying the source to be monitored by a source handle and the destination that performs monitoring by a destination handle, wherein the source handle and the destination handle each indicate at least a port, a Media Access Control (MAC) address or a user name.

* * * * *